(12) United States Patent
Ward, Jr. et al.

(10) Patent No.: US 10,415,964 B2
(45) Date of Patent: *Sep. 17, 2019

(54) METHODS FOR PRODUCING PASSIVE STRAIN INDICATOR ON TURBINE COMPONENTS

(71) Applicant: General Electric Company, Schenectady, NY (US)

(72) Inventors: John David Ward, Jr., Woodruff, SC (US); Bryan Joseph Germann, Greenville, SC (US); Jason Lee Burnside, Greenville, SC (US); Gregory Lee Hovis, Martinez, GA (US)

(73) Assignee: General Electric Company, Schenectady, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/387,944

(22) Filed: Dec. 22, 2016

(65) Prior Publication Data
US 2017/0097234 A1  Apr. 6, 2017

Related U.S. Application Data

(63) Continuation-in-part of application No. 14/291,922, filed on May 30, 2014, now Pat. No. 9,546,928.

(51) Int. Cl.
*G01M 15/14* (2006.01)
*G01B 21/32* (2006.01)
(Continued)

(52) U.S. Cl.
CPC ............. *G01B 21/32* (2013.01); *C23C 4/11* (2016.01); *C23C 24/04* (2013.01); *F01D 17/04* (2013.01); *G01B 11/165* (2013.01); *G01L 1/2287* (2013.01); *G01M 5/0016* (2013.01); *G01M 5/0041* (2013.01); *G01M 15/14* (2013.01);
(Continued)

(58) Field of Classification Search
CPC . C04B 35/486; G01M 5/0041; G01M 11/081; G01M 15/14; G01M 5/0016; G01M 5/0033; B23K 2203/52; B23K 26/264; G01L 5/00
See application file for complete search history.

(56) References Cited

U.S. PATENT DOCUMENTS 4,227,842 A   10/1980 Samanta et al.
4,323,325 A    4/1982 Samanta et al.
(Continued)

FOREIGN PATENT DOCUMENTS

EP      0009859 B1    11/1984
EP      2469258 A2     6/2012
WO   2013075202 A1     5/2013

OTHER PUBLICATIONS

EP Search Report regarding application No. 15168955.1-1362, dated Oct. 29, 2015.

*Primary Examiner* — Freddie Kirkland, III
(74) *Attorney, Agent, or Firm* — Frank A. Landgraff; Charlotte C. Wilson; James W. Pemrick

(57) ABSTRACT

Methods for manufacturing passive strain indicator on turbine components include providing a turbine component comprising an exterior surface, and, depositing a ceramic material onto a portion of the exterior surface to form a passive strain indicator comprising at least two reference points.

16 Claims, 3 Drawing Sheets

(51) Int. Cl.
   *C23C 24/04* (2006.01)
   *F01D 17/04* (2006.01)
   *G01M 5/00* (2006.01)
   *G01B 11/16* (2006.01)
   *G01L 1/22* (2006.01)
   *C23C 4/11* (2016.01)

(52) U.S. Cl.
   CPC ...... *F05D 2230/31* (2013.01); *F05D 2260/80* (2013.01); *F05D 2260/83* (2013.01); *F05D 2270/808* (2013.01)

(56) References Cited

U.S. PATENT DOCUMENTS

| | | | |
|---|---|---|---|
| 4,396,445 A * | 8/1983 | Sasaki | B22F 7/062 156/293 |
| 4,580,524 A | 4/1986 | Lackey, Jr. et al. | |
| 4,939,368 A | 7/1990 | Brown | |
| 5,418,003 A | 5/1995 | Bruce et al. | |
| 5,465,780 A | 11/1995 | Muntner et al. | |
| 5,689,332 A | 11/1997 | Ellingson et al. | |
| 6,074,706 A | 6/2000 | Beverley et al. | |
| 6,251,504 B1 | 6/2001 | Jaslier et al. | |
| 6,337,465 B1 * | 1/2002 | Masters | H01L 41/0926 219/121.69 |
| 6,432,478 B2 | 8/2002 | Jaslier et al. | |
| 7,284,439 B2 * | 10/2007 | Jonsson | G01L 9/0073 73/724 |
| 7,992,441 B2 * | 8/2011 | Mulligan | G01L 19/0627 73/706 |
| 8,727,831 B2 | 5/2014 | Nelson et al. | |
| 8,815,625 B2 * | 8/2014 | Monichino | G01L 9/0052 257/414 |
| 8,818,078 B2 * | 8/2014 | Telfer | F03D 17/00 382/149 |
| 9,144,155 B2 * | 9/2015 | Schmideder | B81B 7/0006 |
| 9,207,154 B2 * | 12/2015 | Harding | G01N 3/08 |
| 9,546,928 B2 * | 1/2017 | Ward, Jr. | C23C 4/11 |
| 2001/0008708 A1 | 7/2001 | Jaslier et al. | |
| 2004/0121182 A1 | 6/2004 | Hardwicke et al. | |
| 2006/0288794 A1 | 12/2006 | Hardwicke et al. | |
| 2007/0062300 A1 * | 3/2007 | Dorfman | G01B 7/18 73/776 |
| 2008/0318008 A1 * | 12/2008 | Wielstra | B26B 19/38 428/195.1 |
| 2009/0311416 A1 | 12/2009 | Nelson et al. | |
| 2010/0024563 A1 * | 2/2010 | Mulligan | G01L 19/0627 73/716 |
| 2012/0176629 A1 * | 7/2012 | Allen | G01D 5/34746 356/616 |
| 2012/0197597 A1 | 8/2012 | Mitchell et al. | |
| 2013/0202192 A1 * | 8/2013 | Telfer | G06T 7/0004 382/154 |
| 2013/0251939 A1 * | 9/2013 | Kleinow | B32B 18/00 428/121 |
| 2014/0121182 A1 * | 5/2014 | Bakale | C07F 5/025 514/64 |
| 2015/0346057 A1 * | 12/2015 | Ward, Jr. | C23C 4/11 73/762 |
| 2015/0346058 A1 * | 12/2015 | Ward, Jr. | B23K 26/364 73/112.01 |

* cited by examiner

METHODS FOR PRODUCING PASSIVE STRAIN INDICATOR ON TURBINE COMPONENTS

This application is a continuation in part of U.S. Ser. No. 14/291,922 filed May 30, 2014.

BACKGROUND OF THE INVENTION

The subject matter disclosed herein relates to passive strain indicator that function as passive strain indicator and, more specifically, to methods for producing ceramic passive strain indicator on turbine components for high temperature applications.

In gas turbine engines, such as aircraft engines for example, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine which are in contact with these gases. Operation of these engines at gas temperatures that are above the metal part melting temperatures may depend in part one or more protective coatings and/or on supplying a cooling air to the outer surfaces of the metal parts through various methods. The metal parts of these engines that are particularly subject to high temperatures, and thus require particular attention with respect to cooling, are the metal parts forming combustors and parts located aft of the combustor.

Moreover, the turbine components may experience stress and/or strain from various forces over its operational life-cycle. While various tools may be utilized to measure imparted stress and strain in relatively standard environments, the turbine components in turbine engines may experience hotter and/or more corrosive working conditions that may be unsuitable for such measurement tools.

Accordingly, alternative passive strain indicator and methods for producing ceramic passive strain indicator on turbine components would be welcome in the art.

BRIEF DESCRIPTION OF THE INVENTION

In one embodiment, a method for manufacturing a passive strain indicator on a turbine component is disclosed. The method includes providing a turbine component comprising an exterior surface, and, depositing a ceramic material onto a portion of the exterior surface to form a passive strain indicator comprising at least two reference points.

In another embodiment, a method of monitoring a turbine component is disclosed. The method includes providing a turbine component comprising an exterior surface and depositing a ceramic material onto a portion of the exterior surface to form a passive strain indicator comprising at least two reference points. The method further includes measuring a second distance between a first of the at least two reference points of the passive strain indicator and a second of the at least two reference points of the passive strain indicator at a second time internal. Finally, the method includes comparing the second distance to a first distance between the first of the at least two reference points of the passive strain indicator and the second of the at least two reference points of the passive strain indicator from a first time interval.

In yet another embodiment, a turbine component is disclosed. The turbine component includes an exterior surface, and, a passive strain indicator deposited on a portion of the exterior surface, the passive strain indicator comprising ceramic material and at least two reference points.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
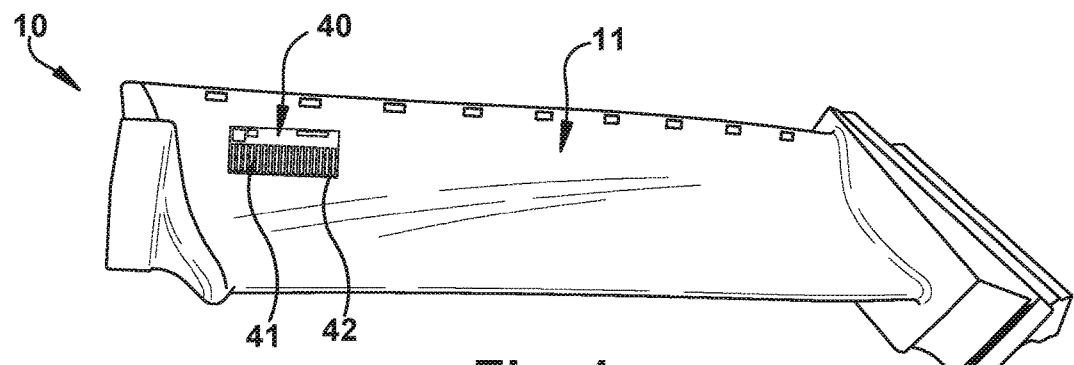
FIG. 1 is an exemplary turbine component comprising a passive strain indicator according to one or more embodiments shown or described herein.

Referring now to FIG. 1, a turbine component 10 is illustrated with a passive strain indicator 40 comprising ceramic material 30 deposited on a portion of the turbine component's exterior surface 11.

The turbine component 10 can comprise a variety of specific components such as those utilized in high temperature applications (e.g., components comprising nickel or cobalt based superalloys). For example, in some embodiments, the turbine component 10 may comprise a combustion component or hot gas path component. In some particular embodiments, the turbine component 10 may comprise a bucket, blade, vane, nozzle, shroud, rotor, transition piece or casing. In other embodiments, the turbine component 10 may comprise any other component of a turbine such as a component for a gas turbine, industrial gas turbine, steam turbine or the like.

Figure 4:
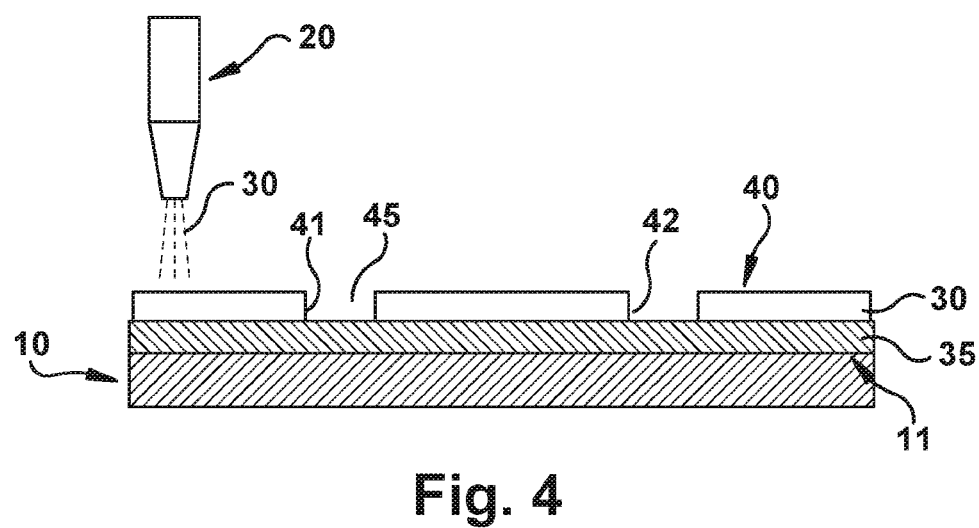
FIG. 4 is a cross section of another exemplary passive strain indicator on a turbine component according to one or more embodiments shown or described herein.
Figure 5:
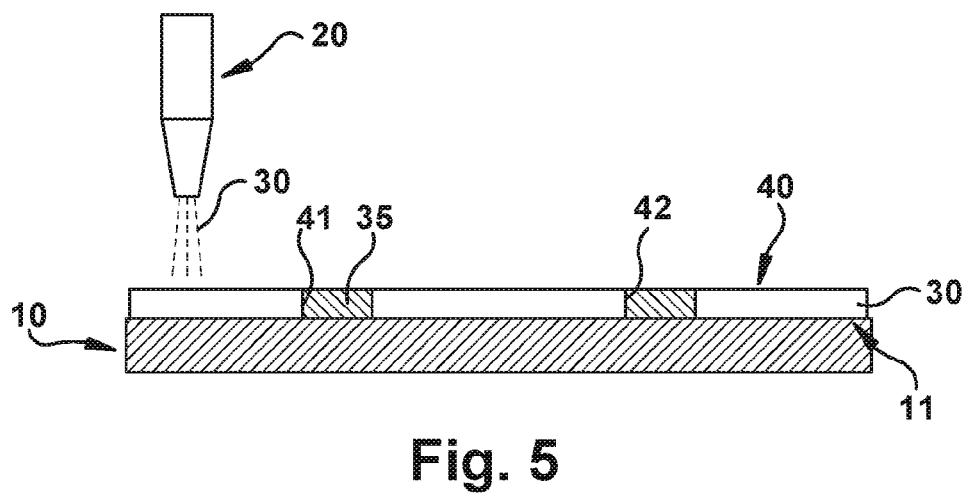
FIG. 5 is a cross section of yet another passive strain indicator on a turbine component according to one or more embodiments shown or described herein.

The turbine component 10 has an exterior surface 11. As should be appreciated herein, the exterior surface 11 may have one or more exposed portions 12 and can include any area suitable for the location of a passive strain indicator 40 for the subsequent capturing of strain measurements. As used herein, "exposed portion" refers to an area of the exterior surface 11 that is, at least initially, absent of ceramic coatings (e.g., thermal barrier coating or the like). In such embodiments, the absence of ceramic coatings may allow for the base metal/alloy to be more visibly identifiable when analyzing the at last two reference points 41 and 42 of the passive strain indicator 40 as should be appreciated herein. As should also become appreciated herein, in some embodiments, the exposed portion 12 may subsequently be coated with a supplemental material such as a visually contrasting material 35 (as illustrated in FIGS. 4 and 5) that is visually distinct from the passive strain indicator 40.

Referring now to FIGS. 1-5, the passive strain indicator 40 is deposited on a portion of the exterior surface 11 of the turbine component 10. The passive strain indicator 40 generally comprises at least two reference points 41 and 42 that can be used to measure the distance D between said at least two reference points 41 and 42 at a plurality of time intervals. As should be appreciated to those skilled in the art, these measurements can help determine the amount of strain, strain rate, creep, fatigue, stress, etc. at that region of the turbine component 10. The at least two reference points 41 and 42 can be disposed at a variety of distances and in a variety of locations depending on the specific turbine component 10 so long as the distance D there between can be measured. Moreover, the at least two reference points 41 and 42 may comprise dots, lines, circles, boxes or any other geometrical or non-geometrical shape so long as they are consistently identifiable and may be used to measure the distance D there between.

The passive strain indicator 40 comprises a ceramic material that is deposited by a deposition apparatus 20. More specifically, the passive strain indicator 40 itself comprises any ceramic material or materials suitable for deposition (such as utilizing a ceramic powder through an automated additive manufacturing process) and optical recognition (such as for measuring the distance D between the at least two reference points 41 and 42 as discussed above). The ceramic passive strain indicator 40 may provide increased temperature survivability compared to other passive strain indicator materials. For example, in some embodiments, the ceramic material 30 may comprise a thermal barrier coating such as yttria-stabilized zirconia (also referred to as YSZ). In such embodiments, the YSZ may comprise, for example, YSZ-D 111. In even some embodiments, the passive strain indicator 40 may comprise a metallic bond coat and/or thermally grown oxide to assist in the deposition of the ceramic top coat (e.g., YSZ). While some particular turbine components 10 (or at least particular locations thereon) may not experience the elevated temperatures to require thermal barrier coatings, such utilization for the passive strain indicator 40 may ensure its longevity where other passive strain indicator materials (e.g., polymeric materials, chemical dyes, etc.) could potentially break down and disappear from the relatively harsh environment.

In some embodiments, the passive strain indicator 40 may comprise a visually contrasting material 35 in addition to the ceramic material 30. As used herein, "visually contrasting material" 35 refers to any material that visually contrasts with the ceramic material such as through different colors or patterns. The visually contrasting material 35 may help facilitate identification of the first and second reference points 41 and 42 of the passive strain indicator 40 by visually highlighting their locations for an operator and/or machine. The visually contrasting material 35 may comprise any additional metal, alloy, ceramic or the like that can similarly survive on the turbine component 10 during operation. For example, in some embodiments, the visually contrasting material 35 may comprise a doped version of the ceramic material 30 that changes its color.

In some embodiments, such as that illustrated in FIG. 4, the visually contrasting material 35 may be uniformly deposited onto a portion of the exterior surface 11 of the turbine component 10 prior to the deposition of the ceramic material 30 comprising the passive strain indicator. Such embodiments may allow for the visually contrasting material to be seen through the negative space 45 between portions of the ceramic material 30. In some embodiments, such as that illustrated in FIG. 5, the visually contrasting material 35 may be deposited directly within the negative space 45 of the passive strain indicator (i.e., between portions of the ceramic material 30) such that the ceramic material 30 and the visually contrasting material 35 form one substantial layer.

In some embodiments, the passive strain indicator 40 itself may comprise any other detectable type of contrasting characteristic that sets it apart from the underlying turbine component 10. For example, the passive strain indicator 40 may comprise a different height, roughness, pattern or the like, may emit distinct energy (e.g., photoluminescence, radiation, etc.), or may comprise any other differentiating characteristic compared to the turbine component 10. These and similar embodiments may facilitate the identification of, and measurements between, the first and second reference points 41 and 42 such as through surface metrology, energy emission analysis or the like.

The ceramic material 30 may be deposited using any deposition apparatus 20 suitable for depositing with high enough precision to form the passive strain indicator 40 as should be appreciated herein. For example, in some embodiments, the deposition apparatus 20 may comprise an aerosol jet coater (e.g., Aerosol Jen and LENS systems from Optomec), Micro Dispensing Machine (e.g., Micropen or 3Dn from Ohcraft, Inc. or nScrypt, Inc.), MesoPlasma from MesoScribe Technologies, Inc., plasma spray, or any other suitable apparatus or combinations thereof.

As discussed herein, the passive strain indicator 40 may be utilized in conjunction with optical recognition techniques to help determine one or more distance measurements between at least the first and second reference points 41 and 42. Accordingly, the deposition apparatus 20 may deposit the ceramic material 30 with a suitable resolution to define a passive strain indicator 40 that comprises at least first and second reference points 41 and 42 that are optically identifiable, such as by a machine or individual. In some embodiments, the deposition apparatus 20 may deposit the ceramic material 30 with a resolution of at least 3 millimeters. In even some embodiments, the deposition apparatus 20 may deposit the ceramic material 30 with a resolution of up to 10 microns. Likewise, in some particular embodiments, the ceramic material 30 may comprise a particular viscosity to help facilitate deposition. For example, in some embodiments, the ceramic material 30 may comprise a viscosity of from about 1 Cp to about 1,000 Cp.

By tailoring the viscosity of the ceramic material 30 and utilizing a select deposition apparatus 20, in some embodiments, the deposition apparatus 20 may deposit the passive strain indicator 40 in near net shape. As used herein, "near net shape" refers to the final desired shape or geometry without requiring subsequent rework (such as material removal through grinding, etching or the like). Such embodiments may provide for the consistent application of passive strain indicator 40 across a variety of turbine components 10 while reducing the amount of labor required to reach a final, viable product.

In some embodiments, the ceramic material 30 (and potentially any visually contrasting material 35) may undergo a curing and/or sintering stage. Any curing and/or sintering may depend on the specific type of ceramic material 30 and can comprise any suitable temperature and time to substantially solidify the passive strain indicator 40 onto the exterior surface 11 of the turbine component 10. In some particular embodiments, the ceramic material 30 may be cured and/or sintered while the passive strain indicator is still being deposited on the turbine component. For example, a first layer of ceramic material 30 may be deposited and partially cured into a green state. One or more additional layers of ceramic material 30 may then be deposited on the first layer and also cured. All of the layers of the ceramic material 30 may then be sintered at the same time. However, in some embodiments comprising multiple layers of ceramic material 30, each layer may be fully sintered prior to the deposition of subsequent layers. In some embodiments comprising a single layer, the ceramic material 30 may be uniformly cured and/or sintered after the passive strain indicator 40 is completely deposited onto the turbine component 10.

Figure 2:
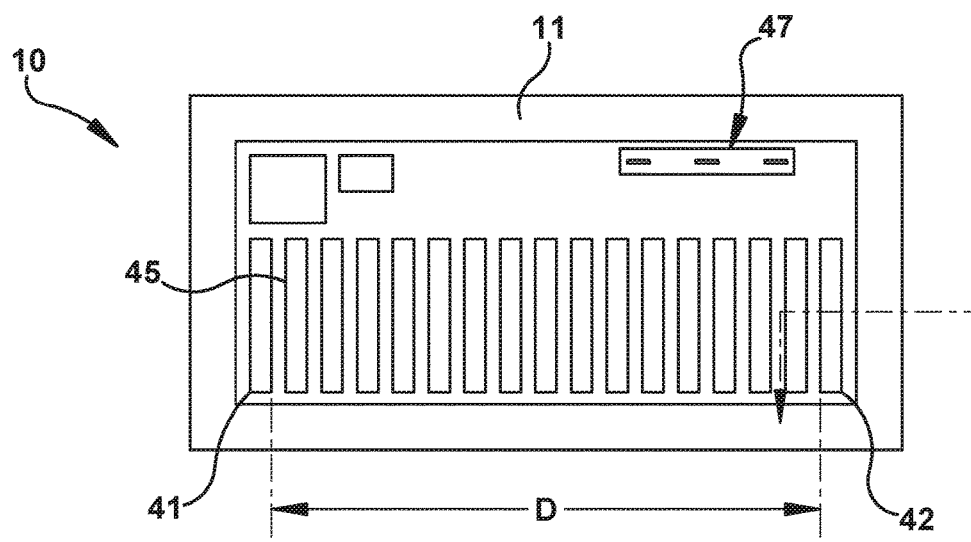
FIG. 2 is an exemplary passive strain indicator according to one or more embodiments shown or described herein.
Figure 3:
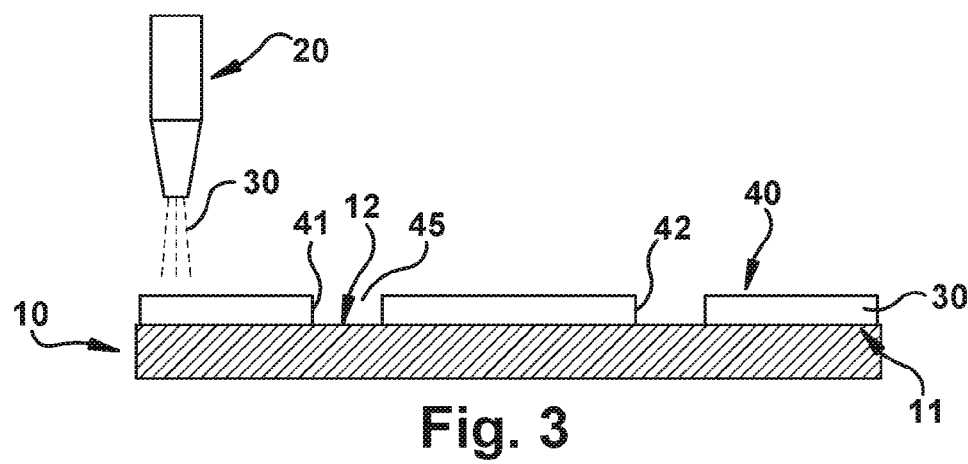
FIG. 3 is cross section of an exemplary passive strain indicator on a turbine component according to one or more embodiments shown or described herein.

As best illustrated in FIGS. 2-5, the passive strain indicator 40 may comprise a variety of different configurations and cross-sections such as by incorporating a variety of differently shaped, sized, and positioned reference points 41 and 42. For example, as illustrated in FIG. 2, the passive strain indicator 40 may comprise a variety of different reference points comprising various shapes and sizes. Such embodiments may provide for a greater variety of distance measurements D such as between the outer most reference points (as illustrated), between two internal reference points, or any combination there between. The greater variety may further provide a more robust strain analysis on a particular portion of the turbine component 10 by providing strain measurements across a greater variety of locations.

Furthermore, the dimensions of the passive strain indicator 40 may depend on, for example, the turbine component 10, the location of the passive strain indicator 40, the targeted precision of the measurement, deposition technique, and optical measurement technique. For example, in some embodiments, the passive strain indicator 40 may comprise a length and width ranging from less than 1 millimeter to greater than 300 millimeters. Moreover, the passive strain indicator 40 may comprise any thickness that is suitable for deposition and subsequent optical identification without significantly impacting the performance of the underlying turbine component 10. For example, in some embodiments, the passive strain indicator 40 may comprise a thickness of less than from about 0.1 millimeters to greater than 1 millimeter. In some embodiments, the passive strain indicator 40 may have a substantially uniform thickness. Such embodiments may help facilitate more accurate measurements for subsequent strain calculations between the first and second reference points 41 and 42.

In some embodiments, the passive strain indicator 40 may comprise a positively deposited square or rectangle wherein the first and second reference points 41 and 42 comprise two opposing sides of said square or rectangle. In other embodiments, the passive strain indicator 40 may comprise at least two deposited reference points 41 and 42 separated by negative space 45 (i.e., an area in which ceramic material 30 is not deposited). The negative space 45 may comprise, for example, an exposed portion 12 of the exterior surface 11 of the turbine component 10. Alternatively or additionally, the negative space 45 may comprise a subsequently deposited visually contrasting material 35 that is distinct from the material of the at least two reference points 41 and 42.

As illustrated in FIG. 2, in even some embodiments, the ceramic material 30 of the passive strain indicator 40 may be deposited to form a unique identifier 47 (hereinafter "UID"). The UID 47 may comprise any type of barcode, label, tag, serial number, pattern or other identifying system that facilitates the identification of that particular passive strain indicator 40. In some embodiments, the UID 47 may additionally or alternatively comprise information about the turbine component 10 or the overall turbine that the passive strain indicator 40 is deposited on. The UID 47 may thereby assist in the identification and tracking of particular passive strain indicator 40, turbine components 10 or even overall turbines to help correlate measurements for past, present and future operational tracking.

The passive strain indicator 40 may thereby be deposited in one or more of a variety of locations of various turbine components 10. For example, as discussed above, the passive strain indicator 40 may be deposited on a bucket, blade, vane, nozzle, shroud, rotor, transition piece or casing. In such embodiments, the passive strain indicator 40 may be deposited in one or more locations known to experience various forces during unit operation such as on or proximate airfoils, platforms, tips or any other suitable location. Moreover, since the passive strain indicator 40 comprises a ceramic material, the passive strain indicator 40 may be deposited in one or more locations known to experience elevated temperatures (wherein passive strain indicator comprising other materials may corrode and/or erode). For example the passive strain indicator 40 comprising ceramic material may be deposited on a hot gas path or combustion turbine component 10.

In even some embodiments, multiple passive strain indicator 40 may be deposited on a single turbine component 10 or on multiple turbine components 10. For example, a plurality of passive strain indicator 40 may be deposited on a single turbine component 10 (e.g., a bucket) at various locations such that the strain may be determined at a greater number of locations about the individual turbine component 10. Alternatively or additionally, a plurality of like turbine components 10 (e.g., a plurality of buckets), may each have a passive strain indicator 40 deposited in a standard location so that the amount of strain experienced by each specific turbine component 10 may be compared to other like turbine components 10. In even some embodiments, multiple different turbine components 10 of the same turbine unit (e.g., buckets and vanes for the same turbine) may each have a passive strain indicator 40 deposited thereon so that the amount of strain experienced at different locations within the overall turbine may be determined.

Figure 6:
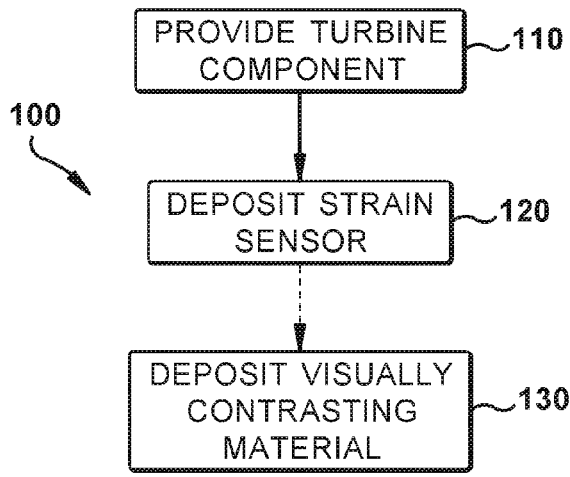
FIG. 6 is an exemplary method for manufacturing a passive strain indicator on a turbine component according to one or more embodiments shown or described herein; and, FIG. 7 is an exemplary method for monitoring a turbine component according to one or more embodiments shown or described herein.

Referring additionally to FIG. 6, a method 100 is illustrated for manufacturing a passive strain indicator 40 on a turbine component 10. The method 100 first comprises providing a turbine component 10 in step 110. As discussed herein, the turbine component 10 can comprise any component having an exterior surface 11. The method further comprises depositing a ceramic material 30 onto a portion of the exterior surface 11 to form the passive strain indicator 40 in step 120. As also discussed herein, the passive strain indicator 40 comprises at least two reference points 41 and 42. In some particular embodiments, the at least two reference points 41 and 42 may be at least partially separated by an exposed portion of the exterior surface 11. In some of these embodiments, the method 100 may further comprise depositing a visually contrasting material 35 in the exposed portion in step 130 to assist in the identification of the at least two reference points 41 and 42. Method 100 may be repeated to produce multiple passive strain indicator 40 on the same turbine component 10, multiple passive strain indicator 40 on different turbine components 10, or combinations thereof.

Figure 7:
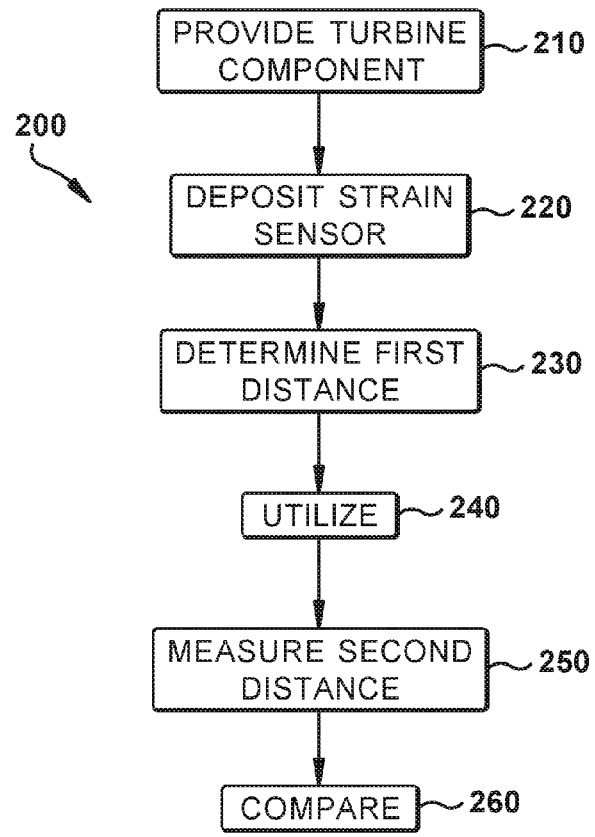

Referring additionally to FIG. 7, another method 200 is illustrated for monitoring a turbine component 10. Similar to method 100, method 200 first comprises providing a turbine component 10 in step 210 and depositing the ceramic material 30 onto a portion of the exterior surface 11 to for a passive strain indicator 40 in step 220. Method 200 further comprises determining a first distance D between a first 41 and a second 42 of the at least two reference points of the passive strain indicator 40 in step 230. In some embodiments, determining the first distance D can be accomplished through measuring. In even some embodiments, such as when depositing the ceramic material 30 is accomplished with high resolution, determining the first distance D may be accomplished by simply knowing the distance based on the deposition specifications of the passive strain indicator 40 in step 220. Method 200 then comprises utilizing the turbine component 10 in a turbine in step 240. Subsequently, method 200 comprises measuring a second distance D between the same first 41 and second 42 of the at least two reference points of the passive strain indicator 40 in step 250. Finally, method 200 comprises comparing the first distance to the second distance in step 260. By comparing the distances measured at different times in step 260, the strain experienced by the turbine component 10 at the location of the passive strain indicator 40 may be determined.

It should now be appreciated that ceramic passive strain indicator may be deposited on turbine components. The ceramic passive strain indicator may facilitate the monitoring of the turbine components performance while withstanding the potentially harsh operating conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for manufacturing a passive strain indicator on a turbine component, the method comprising:
   providing a turbine component comprising an exterior surface;
   depositing a ceramic material onto a portion of the exterior surface to form a passive strain indicator comprising at least two reference points, wherein the ceramic material comprises a first color and the at least two reference points are at least partially separated by an exposed portion of the exterior surface; and
   depositing a visually contrasting material in the exposed portion, the visually contrasting material comprising a second color different from the first color.

2. The method of claim 1, wherein the turbine component comprises a nickel or cobalt based superalloy.

3. The method of claim 1, wherein the ceramic material comprises yttria-stabilized zirconia.

4. The method of claim 1, wherein the ceramic material is deposited using an aerosol jet coater.

5. The method of claim 1, wherein the ceramic material is deposited into a near net shape of the passive strain indicator.

6. The method of claim 1, wherein depositing the ceramic material further comprises forming a unique identifier.

7. A method comprising:
   providing a turbine component comprising an exterior surface;
   depositing a ceramic material onto a portion of the exterior surface to form a passive strain indicator comprising at least two reference points, wherein the ceramic material comprises a first color and the at least two reference points are at least partially separated by an exposed portion of the exterior surface;
   depositing a visually contrasting material in the exposed portion, the visually contrasting material comprising a second color different from the first color;
   measuring a second distance between a first of the at least two reference points of the passive strain indicator and a second of the at least two reference points of the passive strain indicator at a second time internal; and
   comparing the second distance to a first distance between the first of the at least two reference points of the passive strain indicator and the second of the at least two reference points of the passive strain indicator from a first time interval.

8. The method of claim 7, wherein the at least two reference points are at least partially separated by an exposed portion of the exterior surface.

9. The method of claim 8, further comprising depositing a visually contrasting material in the exposed portion prior to measuring the second distance.

10. The method of claim 7, further comprising utilizing the turbine component in a turbine between the first and second time intervals.

11. The method of claim 7, wherein the turbine component comprises a nickel or cobalt based superalloy.

12. The method of claim 7, wherein the ceramic material comprises yttria-stabilized zirconia.

13. A turbine component comprising:
    an exterior surface;
    a passive strain indicator deposited on a portion of the exterior surface, the strain indicator comprising ceramic material and at least two reference points, wherein the ceramic material comprises a first color and the at least two reference points are at least partially separated by an exposed portion of the exterior surface; and a visually contrasting material deposited in the exposed portion, the visually contrasting material comprising a second color different from the first color.

14. The turbine component of claim 13, wherein the turbine component comprises a nickel or cobalt based superalloy.

15. The turbine component of claim 13, wherein the turbine component comprises a hot gas path or combustion component.

16. The turbine component of claim 13, wherein the ceramic material comprises yttria-stabilized zirconia.

\* \* \* \* \*